(12) United States Patent
Wu et al.

(10) Patent No.: US 11,210,449 B2
(45) Date of Patent: Dec. 28, 2021

(54) PAGE DISPLAY METHOD AND DEVICE AND STORAGE MEDIUM

(71) Applicant: BEIJING XIAOMI MOBILE SOFTWARE CO., LTD., Beijing (CN)

(72) Inventors: Hua Wu, Beijing (CN); Hongwei Fan, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 227 days.

(21) Appl. No.: 15/995,547

(22) Filed: Jun. 1, 2018

(65) Prior Publication Data
US 2018/0365199 A1 Dec. 20, 2018

(30) Foreign Application Priority Data
Jun. 14, 2017 (CN) .......................... 201710448938.3

(51) Int. Cl.
| | |
|---|---|
| *G06F 40/10* | (2020.01) |
| *G06F 40/106* | (2020.01) |
| *G06F 16/957* | (2019.01) |
| *G06F 40/205* | (2020.01) |
| *G06F 8/30* | (2018.01) |
| *G06F 9/54* | (2006.01) |

(52) U.S. Cl.
CPC ............ *G06F 40/106* (2020.01); *G06F 8/315* (2013.01); *G06F 9/545* (2013.01); *G06F 16/9574* (2019.01); *G06F 16/9577* (2019.01); *G06F 40/205* (2020.01)

(58) Field of Classification Search
CPC .............. G06F 40/106; G06F 16/9574; G06F 16/9577; G06F 40/205; G06F 8/315; G06F 9/545

USPC .......................................................... 715/234
See application file for complete search history.

(56) References Cited

U.S. PATENT DOCUMENTS

| | | | |
|---|---|---|---|
| 9,349,076 B1 * | 5/2016 | Liu .................... | G06K 9/00369 |
| 2013/0191713 A1 * | 7/2013 | Porras Luraschi | G06F 16/9574 |
| | | | 715/221 |

(Continued)

FOREIGN PATENT DOCUMENTS

| | | |
|---|---|---|
| CN | 104093077 A | 10/2014 |
| CN | 105577813 A | 5/2016 |

(Continued)

OTHER PUBLICATIONS

European Extended Search Report in European Application No. 18176124.8, dated Aug. 22, 2018, 9 pages.

(Continued)

*Primary Examiner* — Hope C Sheffield
(74) *Attorney, Agent, or Firm* — Arch & Lake LLP (57) ABSTRACT

There are provided a page display method and device and a storage medium. The page display device includes a JavaScript execution layer, a conversion layer, and a native layer. The conversion layer converts multiple elements in a virtual tree structure into multiple first views recognizable for the native layer, and sends the multiple first views to the native layer. When a view structure corresponding to view structure data of a first view is cached in a resource pool, the native layer acquires the view structure from the resource pool, and adds the view data of the first view into the view structure to implement page display.

16 Claims, 5 Drawing Sheets

(56) References Cited

U.S. PATENT DOCUMENTS

| | | | | |
|---|---|---|---|---|
| 2014/0136954 | A1* | 5/2014 | Ligman | G06F 17/00 |
| | | | | 715/234 |
| 2014/0164944 | A1* | 6/2014 | Sivakumar | G06F 16/9577 |
| | | | | 715/746 |
| 2017/0255866 | A1* | 9/2017 | Lambe | G06N 5/046 |

FOREIGN PATENT DOCUMENTS

| | | |
|---|---|---|
| CN | 106445583 A | 2/2017 |
| CN | 106528601 A | 3/2017 |

OTHER PUBLICATIONS

Madhuka: "React React. JS and Virtual DOM", Apr. 1, 2015 (Apr. 1, 2015), XP055498623, Retrieved from the Internet: URL:http://madhukaudantha.blogspot.com/2015/04/reactjs-and-virtual-dom.html [retrieved on Aug. 9, 2018].

Anonymous: "React. JS internals: Virtual DOM—Rajika Imal—Medium", Jun. 12, 2017 (Jun. 12, 2017), XP055493978, Retrieved from the Internet: URL:https://web.archive.org/web/20170612083250/https://medium.com/@rajikaimal/reactjs-internals-virtual-dom-d054347b7f00 [retrieved on Jul. 19, 2018].

Marianne Grov: "Building User Interfaces 1-15 Using Virtual DOM", May 20, 2015 (May 20, 2015), XP055498537, DOI: 10.1007/978-3-319-46963-8 12 Retrieved from the Internet:—URL:https://www.duo.uio.no/bitstream/handle/10852/45209/mymaster.pdf?sequence=7 [retrieved on Aug. 8, 2018].

Janne Waren: "Cross-platform mobile software development with React Native"; https://www.theseus.fi/bitstream/handle/10024/119913/janne_waren_cross-platform_mobile_software_development_with_react_native.pdf?sequence=1; Oct. 9, 2016, 30 pages.

First Office Action (including English tranlsation) issued in CN201710448938.3, dated Apr. 1, 2020, 24 pages.

* cited by examiner

PAGE DISPLAY METHOD AND DEVICE AND STORAGE MEDIUM

CROSS-REFERENCE TO RELATED APPLICATIONS

This application is filed based upon and claims priority to Chinese Patent Application of International Application No. 201710448938.3, filed on Jun. 14, 2017, the entire contents of which are incorporated herein by reference.

TECHNICAL FIELD

The present disclosure generally relates to the technical field of computers, and more particularly, to a page display method and device and a storage medium.

BACKGROUND

Along with development of a computer technology, various web applications are developed to facilitate use of users. Since a display effect of a page directly influences a browsing experience of a user when the user browses the page of a web application, for improving the browsing experience of the user, those skilled in the art pay more attention to the problem of how to perform page display.

According to a related technology, in most cases, a page display device is utilized for page display, and the page display device includes a JAVASCRIPT® execution layer and a browser kernel. Specially, the JAVASCRIPT® execution layer parses a specified webpage requested to be displayed to obtain a JAVASCRIPT® file. During execution of the JAVASCRIPT® file, the JAVASCRIPT® execution layer generates a virtual tree structure. The JAVASCRIPT® execution layer converts the virtual tree structure into a tree structure recognizable for the browser kernel, and sends the tree structure to the browser kernel. Then, the browser kernel performs page display according to the tree structure.

SUMMARY

A first aspect of the present disclosure provides a page display method applied in a page display device. The page display device includes a JAVASCRIPT® execution layer, a conversion layer and a native layer. The method includes the following steps. The JAVASCRIPT® execution layer parses a specified webpage requested to be displayed to obtain a JAVASCRIPT® file. During execution of the JAVASCRIPT® file, the JAVASCRIPT® execution layer generates a virtual tree structure, and sends a first drawing message to the conversion layer. The first drawing message includes the virtual tree structure. The virtual tree structure includes multiple elements and each of the elements is described by a JAVASCRIPT® statement. The conversion layer converts the multiple elements in the virtual tree structure into multiple first views recognizable for the native layer. And the conversion layer sends the multiple first views to the native layer. Each of the first views includes view data and view structure data. When a view structure corresponding to the view structure data of the first view is cached in a resource pool, the native layer acquires the view structure from the resource pool and adds the view data of the first view into the view structure to implement page display.

A second aspect of the present disclosure provides a page display device including a JAVASCRIPT® execution layer, a conversion layer and a native layer. The JAVASCRIPT® execution layer is configured to parse a specified webpage requested to be displayed to obtain a JAVASCRIPT® file. The JAVASCRIPT® execution layer is configured to, during execution of the JAVASCRIPT® file, generate a virtual tree structure, and send a first drawing message to the conversion layer. The first drawing message includes the virtual tree structure. The virtual tree structure includes multiple elements and each of the elements is described by a JAVASCRIPT® statement. The conversion layer is configured to convert the multiple elements in the virtual tree structure into multiple first views recognizable for the native layer, and send the multiple first views to the native layer. Each of the first views includes view data and view structure data. When a view structure corresponding to the view structure data of the first view is cached in a resource pool, the native layer is configured to acquire the view structure from the resource pool and add the view data of the first view into the view structure to implement page display.

A third aspect of the present disclosure provides a page display device which may include: a processor; and a memory configured to store an instruction executable for the processor. The processor is configured to cause the following operations. A JAVASCRIPT® execution layer parses a specified webpage requested to be displayed to obtain a JAVASCRIPT® file. During execution of the JAVASCRIPT® file, the JAVASCRIPT® execution layer generates a virtual tree structure, and sends a first drawing message to the conversion layer. The first drawing message includes the virtual tree structure. The virtual tree structure includes multiple elements and each of the elements is described by a JAVASCRIPT® statement. A conversion layer converts the multiple elements in the virtual tree structure into multiple first views recognizable for the native layer, and sends the multiple first views to the native layer. Each of the first views includes view data and view structure data. When a view structure corresponding to the view structure data of the first view is cached in a resource pool, a native layer acquires the view structure from the resource pool and adds the view data of the first view into the view structure to implement page display.

A fourth aspect of the present disclosure provides a computer-readable storage medium which stores at least one instruction. The at least one instruction is loaded and executed by a processor to implement the page display method of the first aspect.

It should be understood that the above general descriptions and detailed descriptions below are merely exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
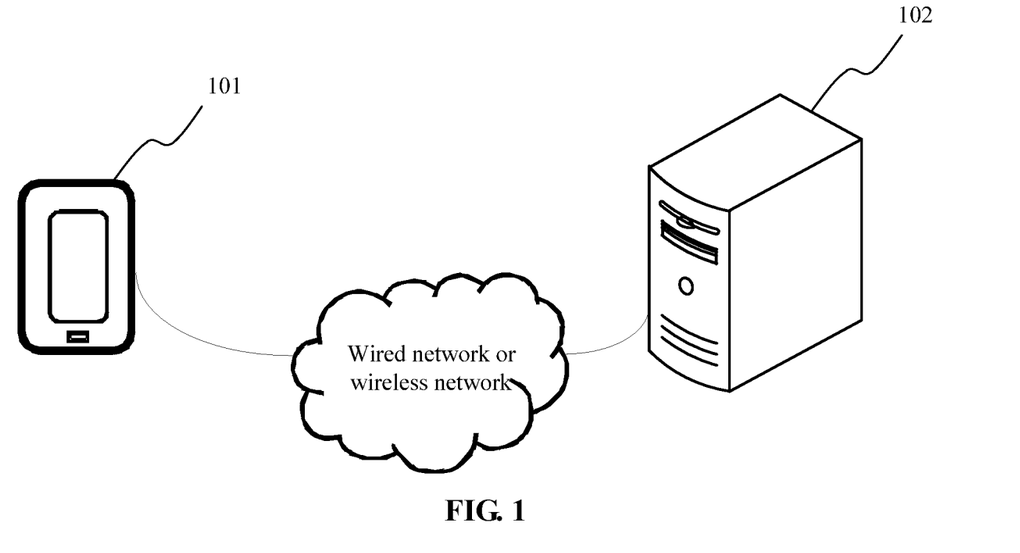
FIG. 1 is an implementation environment involved in a page display method, according to an aspect of the disclosure.

Referring to FIG. 1, an implementation environment involved in a page display method provided by an aspect of the present disclosure is shown. The implementation environment includes a terminal 101.

The terminal 101 may be equipment such as an intelligent mobile phone, a tablet computer and a notebook computer, and a product form of the terminal 101 will not be specifically limited in the embodiment of the present disclosure. The terminal 101 may run and display a page corresponding to a webpage application. Specifically, the terminal may search for the webpage application through a global search box provided by an operating system. Upon detection of a clicking operation over the webpage application, the terminal may further run and display the page corresponding to the webpage application. Upon detection of a clicking operation over a shortcut icon of the webpage application, the terminal 101 may further run and display the page corresponding to the webpage application. For improving a display effect, the terminal 101 includes a page display device, and the page display device includes a JAVASCRIPT® execution layer, a conversion layer and a native layer.

The JAVASCRIPT® execution layer is a logic layer provided by the operating system of the terminal and capable of executing a JAVASCRIPT® statement. The JAVASCRIPT® execution layer may parse a webpage to obtain a JAVASCRIPT® file and generate a virtual tree structure according to the JAVASCRIPT® file. The JAVASCRIPT® execution layer may further modify the virtual tree structure to make the modified virtual tree structure meet a current display requirement of a user.

The conversion layer is a service layer provided by the operating system of the terminal and capable of performing statement conversion. The conversion layer may be an independent service layer in the operating system. Alternatively, the conversion layer may also be a sub-layer responsible for statement conversion in the native layer. The conversion layer will not be specifically limited in the present disclosure. A corresponding relationship between JAVASCRIPT® statements and views is stored in the conversion layer, and the virtual tree structure sent by the JAVASCRIPT® execution layer may be converted into views recognizable for the native layer, thereby implementing conversion from the webpage to a native page.

The native layer is a service layer provided by the operating system of the terminal and capable of performing page rendering. The native layer may call a communication interface provided by the operating system to trigger the operating system to perform page rendering. Upon detection of a triggering operation over a currently displayed page, the native layer may further send a notification message to the JAVASCRIPT® execution layer to enable the JAVASCRIPT® execution layer to modify the virtual tree structure and re-execute a page rendering logic.

The implementation environment may further include a server 102. The server 102 is a background server corresponding to the web application, and the server 102 is configured to provide HTML5 data and the JAVASCRIPT® file for the terminal 101.

According to one or more embodiments of the present disclosure, the terminal 101 may communicate with the server 102 through a wired network or a wireless network, so that it can be guaranteed that terminal 101 acquires data required for display of the web application from the server 102.

Figure 2:
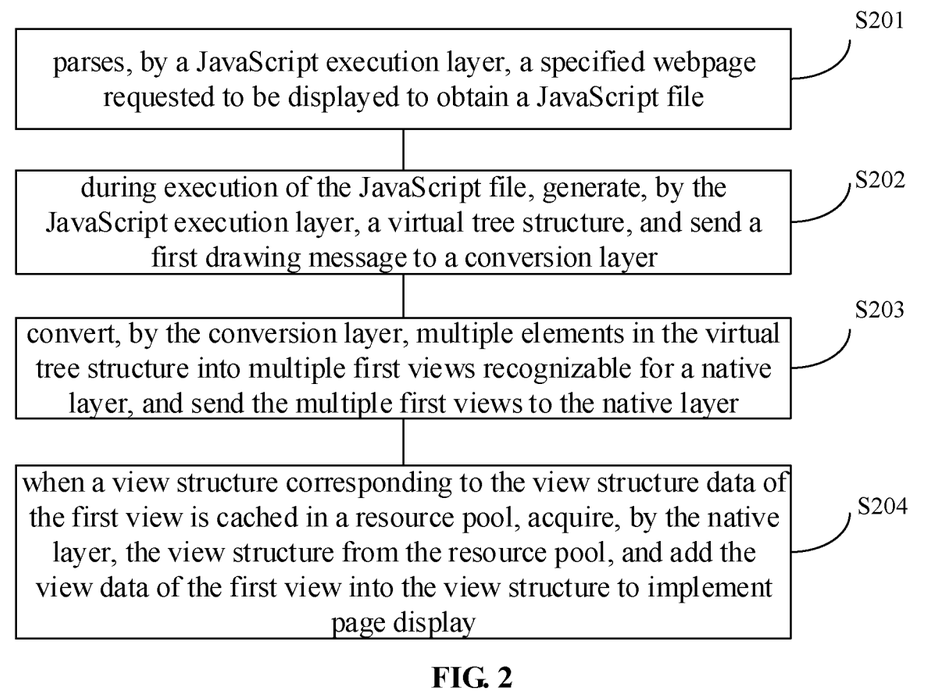
FIG. 2 is a flow chart showing a page display method, according to an aspect of the disclosure.

FIG. 2 is a flow chart showing a page display method, according to an aspect of the disclosure. As shown in FIG. 2, the page display method is applied to a terminal. The terminal includes a page display device which includes a JAVASCRIPT® execution layer, a conversion layer and a native layer. The method includes the following steps.

In Step S201, the JAVASCRIPT® execution layer parses a specified webpage requested to be displayed to obtain a JAVASCRIPT® file.

In Step S202, during execution of the JAVASCRIPT® file, the JAVASCRIPT® execution layer generates a virtual tree structure, and sends a first drawing message to the conversion layer.

The first drawing message includes the virtual tree structure. The virtual tree structure includes multiple elements, where each of the elements is described by a JAVASCRIPT® statement.

In Step S203, the conversion layer converts the multiple elements in the virtual tree structure into multiple first views recognizable for the native layer, and the conversion layer sends the multiple first views to the native layer.

Each of the first views includes view data and view structure data.

In Step S204, when a view structure corresponding to the view structure data of the first view is cached in a resource pool, the native layer acquires the view structure from the resource pool, and adds the view data of the first view into the view structure to implement page display. For example, for any first view, when a view structure corresponding to the view structure data of the first view is cached in a resource pool, the native layer may acquire the view structure from the resource pool, and the native layer may then add the view data of the first view into the view structure to implement page display.

According to the method provided by the embodiment of the present disclosure, after receiving the first view, the native layer determines whether the view structure corresponding to the view structure data of the first view is cached in the resource pool. If the corresponding view structure is cached in the resource pool, the native layer may perform page display according to the cached view structure without drawing. Such a process shortens page drawing time, reduces an occupied system memory, and greatly improves system performance.

According to another aspect of the present disclosure, the step of acquiring, by the native layer, the view structure from the resource pool when the view structure corresponding to the view structure data of the first view is cached in the resource pool, includes the following steps.

The native layer acquires a target view structure identifier from the view structure data, and searches, according to the target view structure identifier, the resource pool for a view structure with a structure identifier as same as the target structure identifier.

When the view structure with the structure identifier as same as the target structure identifier is found, the native layer acquires the view structure from the resource pool.

According to another aspect of the present disclosure, the step of adding the view data of the first view into the view structure to implement page display, includes the following steps.

The native layer draws view structures corresponding to the plurality of first views other than said first view according to the view structure data of the other first views, and integrates the view structure into the drawn view structures to obtain a view structure corresponding to the specified webpage.

The native layer adds the view data of the first view and the view data of the other first views into the view structure corresponding to the specified webpage to obtain a native page corresponding to the specified webpage.

The native layer displays the native page.

According to another aspect of the present disclosure, the method further includes the following steps.

When the first view is in a hidden state, the native layer acquires the view structure corresponding to the view structure data of the first view, and stores the view structure into the resource pool.

According to another aspect of the present disclosure, the step of sending the first drawing message to the conversion layer includes the following steps.

The JAVASCRIPT® execution layer calls a communication interface between the JAVASCRIPT® execution layer and the conversion layer to send the first drawing message to the conversion layer.

According to another aspect of the present disclosure, the step of converting, by the conversion layer, the multiple elements in the virtual tree structure into the multiple first views recognizable for the native layer, includes the following steps.

The conversion layer converts the multiple elements in the virtual tree structure into the multiple first views recognizable for the native layer based on a preconstructed rule database. A corresponding relationship between JAVASCRIPT® statements and views is stored in the rule database.

According to another aspect of the present disclosure, the method further includes the following steps.

When an updated JAVASCRIPT® statement and an updated view are acquired, the conversion layer updates the rule database according to the updated JAVASCRIPT® statement and the updated view.

According to another aspect of the present disclosure, the method further includes the following steps.

When a triggering operation is detected on the specified webpage, the native layer sends a notification message to the JAVASCRIPT® execution layer. The notification message includes a changed element identifier.

The JAVASCRIPT® execution layer modifies the virtual tree structure according to the changed element identifier, and sends a second drawing message to the conversion layer. The second drawing message includes the modified virtual tree structure.

The conversion layer converts multiple elements in the modified virtual tree structure into multiple second views recognizable for the native layer, and sends the multiple second views to the native layer which performs page display.

According to another aspect of the present disclosure, the step of sending, by the native layer, the notification message to the JAVASCRIPT® execution layer, includes the following steps.

The native layer calls a communication interface between the native layer and the JAVASCRIPT® execution layer to send the notification message to the JAVASCRIPT® execution layer.

All of the abovementioned optional technical solutions may be freely combined into optional embodiments of the present disclosure, which will not be elaborated herein one by one.

Figure 3:
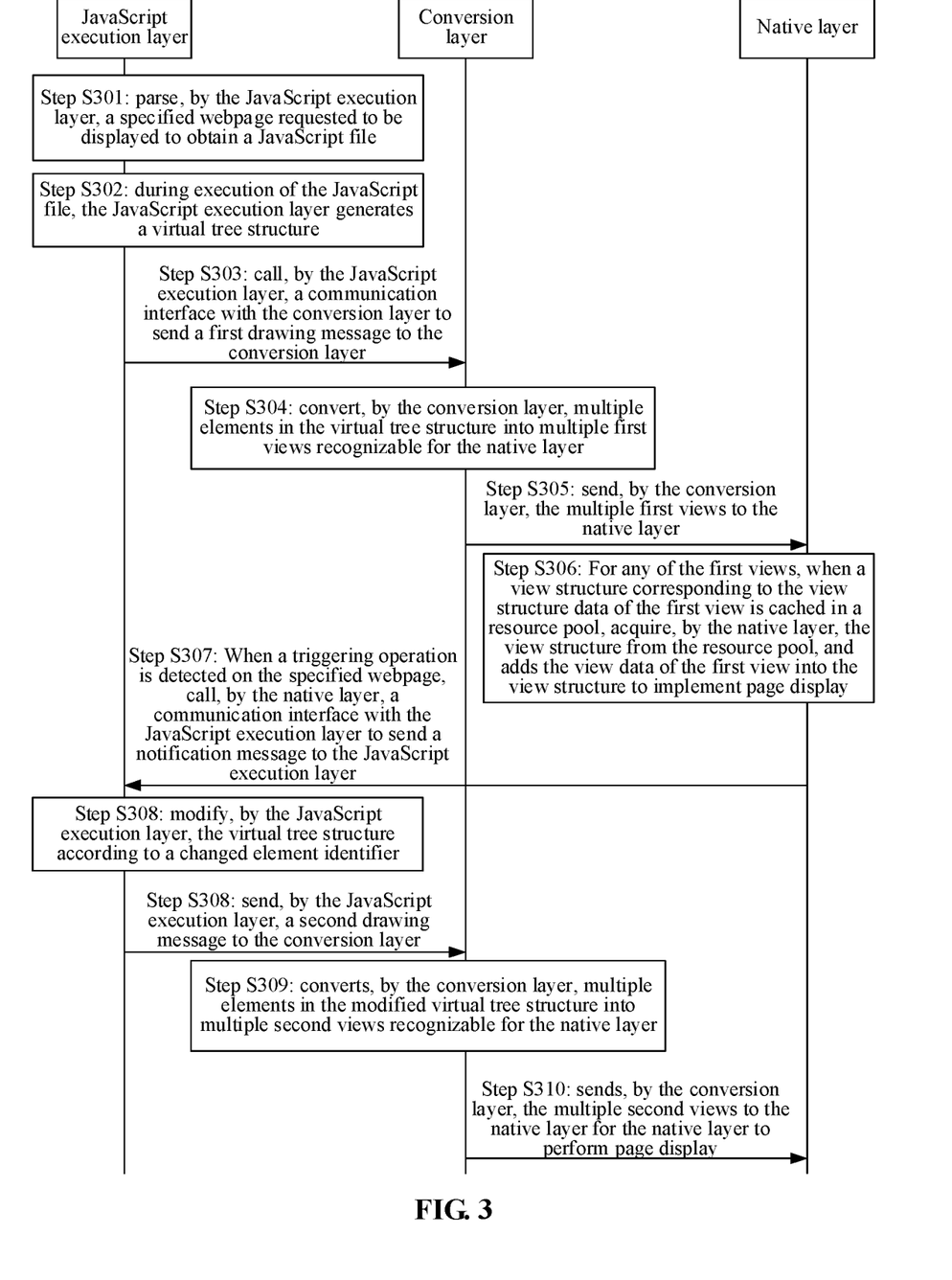
FIG. 3 is a flow chart showing a page display method, according to an aspect of the disclosure.

FIG. 3 is a flow chart showing a page display method, according to an aspect of the disclosure. As shown in FIG. 3, the page display method is applied to a terminal. The terminal includes a page display device which includes a JAVASCRIPT® execution layer, a conversion layer and a native layer. The method includes the following steps.

In Step S301, the JAVASCRIPT® execution layer parses a specified webpage requested to be displayed to obtain a JAVASCRIPT® file.

The specified webpage is a webpage in a web application, and the specified webpage may be a primary webpage in the web application, or may be a webpage higher than secondary webpage in the web application. When the specified webpage is a primary webpage, a source code of the specified webpage may be acquired in the following two manners.

In a first example: during initiation of a browser, a user may input a name of the web application into the browser or a global search box of an operating system by means of equipment such as a mouse according to own reading requirement. Upon detection of a clicking operation of the user over a web application link displayed on the browser of the terminal or the global search box, the terminal generates a display request for the specified webpage. Under triggering of the display request for the specified webpage, the terminal may acquire the source code of the specified webpage from a server. The display request for the specified webpage at least contains attribute information of the specified webpage, including a webpage identifier, a webpage type, a webpage size and the like. The source code of the specified webpage may include a JAVASCRIPT® code and HTML5 data.

In a second example: when a link of the specified webpage is stored in a local memory of the terminal, for example, a shortcut icon corresponding to the specified webpage is displayed on a desktop, the terminal generates the display request for the specified webpage upon detection of a clicking operation of the user over the shortcut icon. Under triggering of the display request for the specified webpage, the terminal may acquire the source code of the specified webpage from the server.

When the specified webpage is a webpage higher than a secondary webpage, the source code of the specified webpage may be acquired in the following manner. Upon detection of a clicking operation over any entry on a primary webpage in the web application (the entry is a title, icon and the like with a webpage link property), the terminal generates the display request for the specified webpage. Under triggering of the display request for the specified webpage, the terminal may acquire the source code of the specified webpage from the server.

Under triggering of the display request for the specified webpage, the JAVASCRIPT® execution layer in the terminal performs JAVASCRIPT® parsing on the specified webpage requested to be displayed to obtain the JAVASCRIPT® file. The JAVASCRIPT® file includes a logic code of the whole page display process.

In Step 5302, during execution of the JAVASCRIPT® file, the JAVASCRIPT® execution layer generates a virtual tree structure.

During execution of the JAVASCRIPT® file, the JAVASCRIPT® execution layer may perform HTML parsing on the HTML5 data to obtain the virtual tree structure. The virtual tree structure includes multiple elements. The elements are data configured to describe the attribute information, webpage content and the like of the webpage in the specified webpage, and each of the elements may be described by a JAVASCRIPT® statement. According to one or more embodiments of the present disclosure, the virtual tree structure may be a Virtual Document Object Model (VDOM) tree.

In Step S303, the JAVASCRIPT® execution layer calls a communication interface between the JAVASCRIPT® execution layer and the conversion layer to send a first drawing message to the conversion layer.

Since each of the elements in the virtual tree structure is described by the JAVASCRIPT® statement, and the JAVASCRIPT® statement may not be recognized by the native layer, according to the related technology, after the virtual tree structure is acquired, the virtual tree structure may only be converted into a tree structure recognizable for a browser kernel and further rendered into a webpage by the browser kernel for display. The fact that the page displayed by the process is a webpage, leads to poor page display effect.

To improve the page display effect and to reproduce a real form of the page and to simultaneously create a real experience of installing the web application for the user, according to the method provided by the embodiment of the present disclosure, after the virtual tree structure is generated, the JAVASCRIPT® execution layer may further generate the first drawing message and further send the first drawing message to the conversion layer. The first drawing message includes the virtual tree structure and the like, and is configured to trigger the conversion layer for statement conversion. In this manner, a native page corresponding to the specified webpage is displayed. Furthermore, the present disclosure further provides a communication interface which may implement communication between the JAVASCRIPT® execution layer and the conversion layer. Based on the communication interface, the JAVASCRIPT® execution layer may call the communication interface between the JAVASCRIPT® execution layer and the conversion layer to send the first drawing message to the conversion layer.

In Step S304, the conversion layer converts multiple elements in the virtual tree structure into multiple first views recognizable for the native layer.

For many applications, research and development personnel may usually develop two types for each application during its development, one is a web application not required to be installed, and the other one is an application required to be installed. In such a case, for the same application, there exists HTML5 data and JAVASCRIPT® code recognizable for the browser kernel and views recognizable for the native layer of the terminal. In practice, it is very difficult for the research and development personnel to learn about the specific type of the application used by the user. Therefore, the research and development personnel may usually pack the HTML5 data, the JAVASCRIPT® file and the views together in the developed application. In this way, when the user browses the webpage corresponding to the web application, the conversion layer in the terminal may acquire the JAVASCRIPT® statement and views from data parsed by the JAVASCRIPT® execution layer. Based on the acquired JAVASCRIPT® statement and views, the conversion layer may establish a rule database. A corresponding relationship between JAVASCRIPT® statements and views is stored in the rule database. For facilitating subsequent application, the conversion layer may further store the established rule database.

Based on the preconstructed rule database, when converting the multiple elements in the virtual tree structure into the multiple first views recognizable for the native layer, the conversion layer may acquire, from the rule database, a view corresponding to the JAVASCRIPT® statement configured to describe each element from the virtual tree structure, and determine the acquired view as a first view. The first view includes view data and view structure data. The view data is configured to determine a page content corresponding to the first view. The view structure data is configured to determine a page layout corresponding to the first view.

Since the JAVASCRIPT® statement may be variable, for ensuring real-time effectiveness of the rule database, when an updated JAVASCRIPT® statement and an updated view are acquired, the conversion layer may further update the rule database according to the updated JAVASCRIPT® statement and the updated view.

In Step S305, the conversion layer sends the multiple first views to the native layer.

The embodiments of the present disclosure provide a communication interface which may implement communication between the conversion layer and the native layer. Based on the communication interface, the conversion layer may send the multiple first views converted from the multiple elements in the virtual tree structure to the native layer which further performs page display.

In Step S306, for any first view, when a view structure corresponding to the view structure data of the first view is cached in a resource pool, the native layer acquires the view structure from the resource pool, and adds the view data of the first view into the view structure to implement page display.

According to the present disclosure, the native layer maintains multiple resource pools, and each of the resource pools is configured to store one type of view structures. When the disclosed method is adopted for page display, if any view is switched from a display state to a hidden state by a triggering operation of the user, the native layer may acquire the view structure corresponding to the view data of the view and store the view structure into the resource pool. The diversity of a layout of a webpage leads to the diversity of the view structure corresponding to the webpage. For facilitating searching for a reusable view structure in the page display process, the native layer may store the view structure into the resource pool according to a view structure identifier after acquiring the view structure. During the development of the webpage applications, a developer can use different view structure identifiers to identify different view structures.

According to the present disclosure, after the native layer receives the first view sent by the conversion layer, the native layer determines whether the view structure corresponding to the view structure data of the first view is stored in the resource pool rather than directly draw the first view, and then adopts different methods to acquire the corresponding view structure according to whether the view structure corresponding to the view structure data of the first view is stored in the resource pool. During specific implementation, the native layer may acquire a target view structure identifier from the view structure data and search, according to the target view structure identifier, the resource pool for a view structure with a structure identifier as same as the target structure identifier. When the view structure with the structure identifier as same as the target structure identifier is found, the native layer acquires the view structure from the resource pool. When the view structure with the structure identifier as same as the target structure identifier is not found, the native layer may draw the corresponding view structure according to the view structure data of the first view. Considering diversity of webpage forms in a practical display process, the same view structure identifier may correspond to multiple view structures, so that the native layer may randomly acquire one view structure when acquiring the view structure from the resource pool. If the view structure cannot be normally displayed in a subsequent display process, another view structure may be acquired from the resource pool, to avoid influence on a user experience.

Furthermore, after the native layer acquires the view structure from the resource pool, the view structure is not cached in the resource pool any more. That is, a view structure which is drawn but not used currently is cached in the resource pool of the present disclosure.

After the view structure is acquired from the resource pool, the native layer adds the view data of the first view into the view structure to implement page display. During specific implementation, the following Steps S3061~S3063 may be adopted.

In S3061, the native layer draws view structures corresponding to the plurality of first views other than said first view according to the view structure data of the other first views, and integrates the view structure into the drawn view structures to obtain a view structure corresponding to the specified webpage.

During practical integration, integration may be performed according to a position relationship between the first view and the other first views.

In S3062, the native layer adds the view data of the first view and the view data of the other first views into the view structure corresponding to the specified webpage to obtain a native page corresponding to the specified webpage.

The native layer renders the view structure corresponding to the specified webpage to obtain a specified webpage layout by calling an Application Programming Interface (API) of a native Graphical User Interface (GUI) of the operating system, and further draws the view data of each of the first views into the webpage layout corresponding to the view structure to obtain the native page corresponding to the specified webpage.

In S3063, the native layer displays the native page.

It should be noted that, Steps S3061~S3063 are described with the view structure corresponding to one first view as an example. In practice, view structures of multiple first views may be reused when possible. For the reused view structure of each first view, page display may be performed according to the Steps S3061~S3063.

According to another embodiment of the present disclosure, when the first view is switched from the display state to the hidden state due to an operation of the user, the native layer may acquire the view structure corresponding to the view structure data of the first view and store the view structure into the resource pool for reuse during subsequent page display.

In Step S307, when a triggering operation is detected on the specified webpage, the native layer calls a communication interface between the native layer and the JAVASCRIPT® execution layer to send a notification message to the JAVASCRIPT® execution layer.

The triggering operation includes, but not limited to, a slide operation, a clicking operation and the like. In a display process of the native page corresponding to the specified webpage, when the slide operation over the native page is detected or the clicking operation over any webpage link on the native page is detected, a content displayed on the native page may change. At this point, the native layer may send the notification message to the JAVASCRIPT® execution layer, where the notification message is configured to re-trigger a page display logic to enable the displayed page to meet a current browsing requirement of the user. The notification message includes a changed element identifier and an operating type, and the operating type includes an addition operation, a deletion operation and the like.

When sending the notification message to the JAVASCRIPT® execution layer, the native layer may call the communication interface between the native layer and the JAVASCRIPT® execution layer to send the notification message to the JAVASCRIPT® execution layer.

In Step S308, the JAVASCRIPT® execution layer modifies the virtual tree structure according to a changed element identifier, and sends a second drawing message to the conversion layer.

After receiving the notification message, the JAVASCRIPT® execution layer modifies the virtual tree structure according to the operating type of the element corresponding to the changed element identifier. For example, when the operating type is a deletion operation, the JAVASCRIPT® execution layer may delete the element corresponding to the element identifier in the virtual tree structure. When the operating type is an addition operation, the JAVASCRIPT® execution layer may add the element corresponding to the element identifier in the virtual tree structure.

Based on the modified virtual tree structure, the JAVASCRIPT® execution layer generates the second drawing message which includes the modified virtual tree structure and the like. The JAVASCRIPT® execution layer further calls the communication interface between the JAVASCRIPT® execution layer and the conversion layer to send the second drawing message to the conversion layer.

In Step S309, the conversion layer converts multiple elements in the modified virtual tree structure into multiple second views recognizable for the native layer.

In Step S310, the conversion layer sends the multiple second views to the native layer which performs page display.

After receiving the second drawing message, the conversion layer converts, based on the preconstructed rule database, the multiple elements in the modified virtual tree structure into the multiple second views recognizable for the native layer.

Here, the first views and the second views are only intended to describe that the views corresponding to different element may be changed when the content displayed on the page is changed. In practice, the first view and second view may be the same when they correspond to the same element on the page before and after the triggering operation.

After acquiring the multiple second views, the conversion layer sends the multiple second views to the native layer by calling the communication interface between the conversion layer and the native layer. Then the native layer performs page display according to the second views. The native layer may perform page display according to the multiple second views sent by the conversion layer in the following manner. The native layer acquires the first view corresponding to the changed element identifier, and determines whether the first view corresponding to the changed element identifier is cached in the resource pool or not. When the view structure corresponding to the view structure data of the first view is cached in the resource pool, the native layer acquires the view structure from the resource pool. Meanwhile, the native layer acquires the view structure corresponding to an unchanged element identifier, where the view structure includes view data which has been added. Then, the native layer integrates the acquired view structure and the view structure corresponding to the unchanged element identifier to obtain a changed view structure corresponding to the specified webpage. The native layer further adds the view data of the first view corresponding to the changed view element identifier into the corresponding view structure to obtain a changed native page corresponding to the specified webpage.

According to the disclosed method in the present disclosure, after receiving the first view, the native layer determines whether the view structure corresponding to the view structure data of the first view is cached in the resource pool. When the corresponding view structure is cached in the resource pool, the native layer may perform page display according to the cached view structure without re-drawing. Such a process shortens page drawing time, reduces an occupied system memory, and greatly improves system performance.

Figure 4:
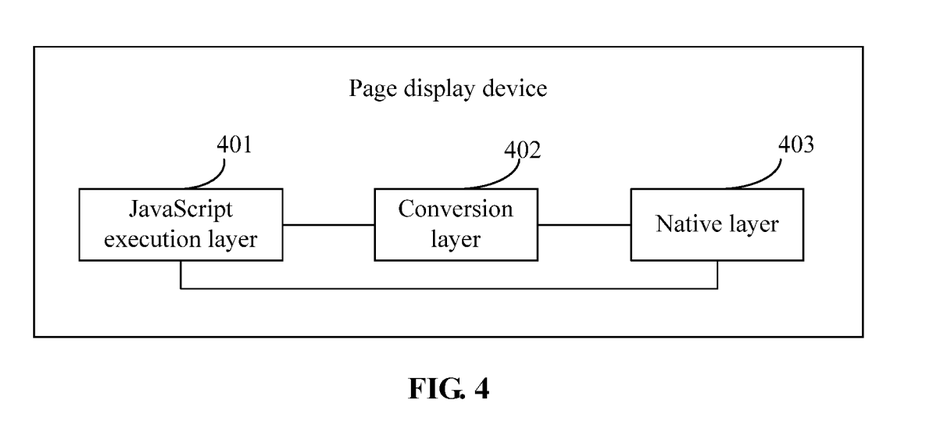
FIG. 4 is a block diagram of a page display device, according to an aspect of the disclosure.

FIG. 4 is a schematic diagram illustrating a page display device, according to an aspect of the disclosure. Referring to FIG. 4, the page display device includes: a JAVASCRIPT® execution layer, a conversion layer, and a native layer.

The JAVASCRIPT® execution layer 401 is configured to parse a specified webpage requested to be displayed to obtain a JAVASCRIPT® file.

The JAVASCRIPT® execution layer is configured to, during execution of the JAVASCRIPT® file, generate a virtual tree structure, and send a first drawing message to the conversion layer 402. The first drawing message includes the virtual tree structure. The virtual tree structure includes multiple elements and each of the elements is described by a JAVASCRIPT® statement.

The conversion layer 402 is configured to convert the multiple elements in the virtual tree structure into multiple first views recognizable for the native layer 403, and send the multiple first views to the native layer. Each of the first views includes view data and view structure data.

In some embodiments, for any first view, the native layer 403 is configured to, when a view structure corresponding to the view structure data of the first view is cached in a resource pool, acquire the view structure from the resource pool, and add the view data of the first view into the view structure to implement page display.

According to another aspect of the present disclosure, the native layer 403 is further configured to acquire a target view structure identifier from the view structure data, and search, according to the target view structure identifier, the resource pool for a view structure with a structure identifier as same as the target structure identifier.

The native layer 403 is further configured to, when the view structure with the structure identifier as same as the target structure identifier is found, acquire the view structure from the resource pool.

According to another aspect of the present disclosure, the native layer 403 is further configured to draw view structures corresponding to the plurality of first views other than said first view according to the view structure data of the other first views, and integrate the view structure into the drawn view structures to obtain a view structure corresponding to the specified webpage.

The native layer 403 is further configured to add the view data of the first view and the view data of the other first views into the view structure corresponding to the specified webpage to obtain a native page corresponding to the specified webpage.

The native layer 403 is further configured to display the native page.

According to another aspect of the present disclosure, the native layer 403 is further configured to, when the first view is in a hidden state, acquire the view structure corresponding to the view structure data of the first view, and store the view structure into the resource pool.

According to another aspect of the present disclosure, the JAVASCRIPT® execution layer 401 is further configured to call a communication interface between the JAVASCRIPT® execution layer and the conversion layer to send the first drawing message to the conversion layer 402.

According to another aspect of the present disclosure, the conversion layer 402 is further configured to convert, based on a preconstructed rule database, the multiple elements in the virtual tree structure into the multiple first views recognizable for the native layer. A corresponding relationship between JAVASCRIPT® statements and views is stored in the rule database.

According to another aspect of the present disclosure, the conversion layer 402 is further configured to, when an updated JAVASCRIPT® statement and an updated view are acquired, update the rule database according to the updated JAVASCRIPT® statement and the updated view.

According to another aspect of the present disclosure, the native layer 403 is further configured to, when a triggering operation is detected on the specified webpage, send a notification message to the JAVASCRIPT® execution layer, the notification message including a changed element identifier.

The JAVASCRIPT® execution layer 401 is further configured to modify the virtual tree structure according to the changed element identifier, and send a second drawing message to the conversion layer. The second drawing message includes the modified virtual tree structure.

The conversion layer 402 is further configured to convert multiple elements in the modified virtual tree structure into multiple second views recognizable for the native layer, and send the multiple second views to the native layer which performs page display.

According to another embodiment of the present disclosure, the native layer 403 is further configured to call a communication interface between the native layer and the JAVASCRIPT® execution layer to send the notification message to the JAVASCRIPT® execution layer.

According to the device provided by the embodiment of the present disclosure, after receiving the first view, the native layer determines whether the view structure corresponding to the view structure data of the first view is cached in the resource pool. When the corresponding view structure is cached in the resource pool, the native layer may perform page display according to the cached view structure without drawing. Such a process shortens page drawing time, reduces an occupied system memory, and greatly improves system performance.

With respect to the device in the above embodiment, the specific manners for performing operations for individual modules therein have been described in detail in the embodiment regarding the method, which will not be elaborated herein.

Figure 5:
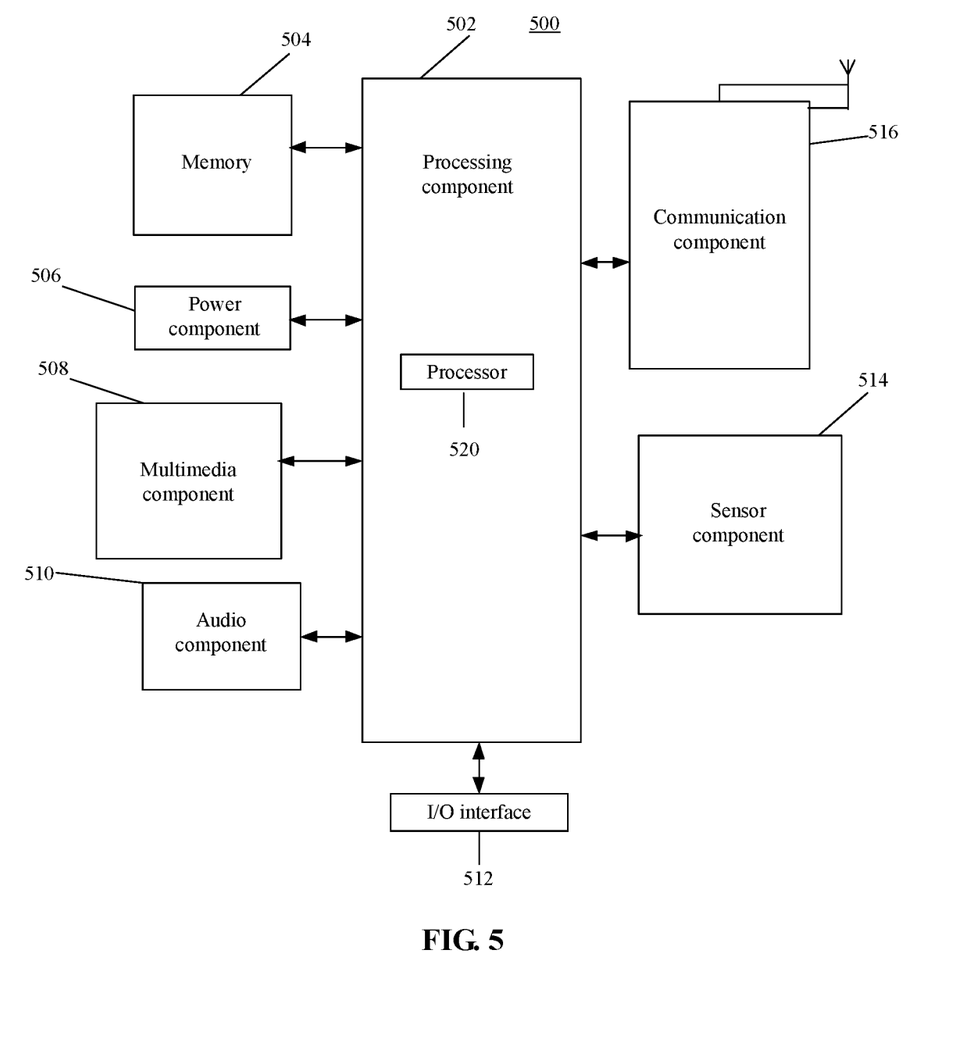
FIG. 5 is a block diagram of a page display device, according to an aspect of the disclosure.

FIG. 5 is a block diagram of a page display device 500, according to an aspect of the disclosure. For example, the device 500 may be a mobile phone, a computer, a digital broadcast terminal, a messaging device, a gaming console, a tablet, a medical device, exercise equipment, a personal digital assistant and the like.

Referring to FIG. 5, the device 500 may include one or more of the following components: a processing component 502, a memory 504, a power component 506, a multimedia component 508, an audio component 510, an Input/Output (I/O) interface 512, a sensor component 514, or a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the steps in the abovementioned method. Moreover, the processing component 502 may include one or more modules which facilitate interaction between the processing component 502 and the other components. For instance, the processing component 502 may include a multimedia module to facilitate interaction between the multimedia component 508 and the processing component 502.

The memory 504 is configured to store various types of data to support the operation of the device 500. Examples of such data include instructions for any application programs or methods operated on the device 500, contact data, phone-book data, messages, pictures, video, etc. The memory 504 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 506 provides power for various components of the device 500. The power component 506 may include a power management system, one or more power supplies, and other components associated with the generation, management and distribution of power for the device 500.

The multimedia component 508 includes a screen providing an output interface between the device 500 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a duration and pressure associated with the touch or swipe action. In some embodiments, the multimedia component 508 includes a front camera and/or a rear camera. The front camera and/or the rear camera may receive external multimedia data when the device 500 is in an operation mode, such as a photographing mode or a video mode. Each of the front camera and the rear camera may be a fixed optical lens system or have focusing and optical zooming capabilities.

The audio component 510 is configured to output and/or input an audio signal. For example, the audio component 510 includes a Microphone (MIC), and the MIC is configured to receive an external audio signal when the device 1400 is in the operation mode, such as a call mode, a recording mode and a voice recognition mode. The received audio signal may be further stored in the memory 504 or sent through the communication component 516. In some embodiments, the audio component 510 further includes a speaker configured to output the audio signal.

The I/O interface 512 provides an interface between the processing component 502 and a peripheral interface module, and the peripheral interface module may be a keyboard, a click wheel, a button and the like. The button may include, but not limited to: a home button, a volume button, a starting button and a locking button.

The sensor component 514 includes one or more sensors configured to provide status assessment in various aspects for the device 500. For instance, the sensor component 514 may detect an on/off status of the device 500 and relative positioning of components, such as a display and small keyboard of the device 500, and the sensor component 514 may further detect a change in a position of the device 500 or a component of the device 500, presence or absence of contact between the user and the device 500, orientation or acceleration/deceleration of the device 500 and a change in temperature of the device 500. The sensor component 514 may include a proximity sensor configured to detect presence of an object nearby without any physical contact. The sensor component 514 may also include a light sensor, such as a Complementary Metal Oxide Semiconductor (CMOS) or Charge Coupled Device (CCD) image sensor, configured for use in an imaging application. In some embodiments, the sensor component 514 may also include an acceleration sensor, a gyroscope sensor, a magnetic sensor, a pressure sensor or a temperature sensor.

The communication component 516 is configured to facilitate wired or wireless communication between the device 500 and other equipment. The device 500 may access a communication-standard-based wireless network, such as a Wireless Fidelity (WiFi) network, a 2nd-Generation (2G) or 3rd-Generation (3G) network or a combination thereof. In an exemplary embodiment, the communication component 516 receives a broadcast signal or broadcast associated information from an external broadcast management system through a broadcast channel. In an exemplary embodiment, the communication component 516 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a Bluetooth (BT) technology and another technology.

In an exemplary embodiment, the device 500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 504 including an instruction, and the instruction may be executed by the processor 520 of the device 500 to implement the abovementioned method. For example, the non-transitory computer-readable storage medium may be a ROM, a Compact Disc Read-Only Memory (CD-ROM), a magnetic tape, a floppy disc, optical data storage equipment and the like.

According to the device provided by the embodiment of the present disclosure, after receiving a first view, a native layer determines whether a view structure corresponding to view structure data of the first view is cached in a resource pool. When the corresponding view structure is cached in the resource pool, the native layer may perform page display according to the cached view structure without drawing. Such a process shortens page drawing time, reduces an occupied system memory, and greatly improves system performance.

An aspect of the present disclosure provides a computer-readable storage medium, in which at least one instruction is stored, the at least one instruction being loaded and executed by a processor to implement the page display method shown in FIG. 2 or FIG. 3.

According to the computer-readable storage medium provided by the embodiment of the present disclosure, a native layer determines whether a view structure corresponding to view structure data of a first view is cached in a resource pool, after receiving the first view. If the corresponding view structure is cached in the resource pool, the native layer may perform page display according to the cached view structure without drawing. Such a process shortens page drawing time, reduces an occupied system memory, and greatly improves system performance.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A page display method, applied to a page display device, the page display device comprising a processor, and a memory for storing program codes executable by the processor; the program codes comprising a JAVASCRIPT® execution layer, a conversion layer, and a native layer; the processor being configured to call the program codes to perform acts comprising:
    parsing, by the JAVASCRIPT® execution layer, a specified webpage requested to be displayed to obtain a JAVASCRIPT® file;
    during execution of the JAVASCRIPT® file, generating, by the JAVASCRIPT® execution layer, a virtual tree structure, and sending a first drawing message to the conversion layer, wherein the first drawing message comprises the virtual tree structure, the virtual tree structure comprises a plurality of elements and each of the elements is described by a JAVASCRIPT® statement;
    converting, by the conversion layer, the plurality of elements in the virtual tree structure into a plurality of first views recognizable for the native layer, and sending the plurality of first views to the native layer, wherein the plurality of first views comprises a first view; and
    when a view structure corresponding to view structure data of the first view is cached in a resource pool, acquiring, by the native layer, the view structure from the resource pool, and adding view data of the first view into the view structure to implement page display, wherein the view data comprises page content of the first view, and the view structure comprises a page layout of the first view,
    wherein acquiring, by the native layer, the view structure from the resource pool comprises:
        acquiring, by the native layer, a target view structure identifier from the view structure data of the first view, and searching, according to the target view structure identifier, the resource pool for a view structure with a structure identifier which is the same as the target structure identifier; and
        when a plurality of view structures are found in the resource pool, randomly acquiring, by the native layer, the view structure from the plurality of view structures, wherein each of the plurality of view structures has a structure identifier which is the same as the target structure identifier; and
    wherein adding the view data of the first view into the view structure to implement page display comprises:
        drawing, by the native layer, view structures corresponding to the plurality of first views other than the first view according to view structure data of the other first views, and integrating the view structure into the drawn view structures to obtain a view structure corresponding to the specified webpage;
        adding, by the native layer, the view data of the first view and the view data of the other first views into the view structure corresponding to the specified webpage to obtain a native page corresponding to the specified webpage; and
        displaying, by the native layer, the native page.

2. The method of claim 1, further comprising:
    after the first view is displayed, when the first view is in a hidden state, acquiring, by the native layer, the view structure corresponding to the view structure data of the first view, and storing the view structure into the resource pool.

3. The method of claim 1, wherein sending the first drawing message to the conversion layer comprises:
    calling, by the JAVASCRIPT® execution layer, a communication interface between the JAVASCRIPT® execution layer and the conversion layer to send the first drawing message to the conversion layer.

4. The method of claim 1, wherein converting, by the conversion layer, the plurality of elements in the virtual tree structure into the plurality of first views recognizable for the native layer comprises:
    converting, by the conversion layer, the plurality of elements in the virtual tree structure into the plurality of first views recognizable for the native layer based on a preconstructed rule database, wherein a corresponding relationship between JAVASCRIPT® statements and views is stored in the rule database.

5. The method of claim 4, further comprising:
    when an updated JAVASCRIPT® statement and an updated view are acquired, updating, by the conversion layer, the rule database according to the updated JAVASCRIPT® statement and the updated view.

6. The method of claim 1, further comprising:
    when a triggering operation is detected on the specified webpage, sending, by the native layer, a notification message to the JAVASCRIPT® execution layer, the notification message comprising a changed element identifier;

modifying, by the JAVASCRIPT® execution layer, the virtual tree structure according to the changed element identifier, and sending a second drawing message to the conversion layer, the second drawing message comprising the modified virtual tree structure; and converting, by the conversion layer, a plurality of elements in the modified virtual tree structure into a plurality of second views recognizable for the native layer, and sending the plurality of second views to the native layer which performs page display.

7. The method of claim 6, wherein sending, by the native layer, the notification message to the JAVASCRIPT® execution layer comprises:

calling, by the native layer, a communication interface between the native layer and the JAVASCRIPT® execution layer to send the notification message to the JAVASCRIPT® execution layer.

8. A page display device, comprising:
a processor; and
a memory configured to store program codes executable for the processor, the program codes comprising a JAVASCRIPT® execution layer, a conversion layer and a native layer;
wherein the processor is configured to call the program codes to:
parse, by the JAVASCRIPT® execution layer, a specified webpage requested to be displayed to obtain a JAVASCRIPT® file;
during execution of the JAVASCRIPT® file, generate, by the JAVASCRIPT® execution layer, a virtual tree structure, and send a first drawing message to the conversion layer, wherein the first drawing message comprises the virtual tree structure, the virtual tree structure comprises a plurality of elements and each of the elements is described by a JAVASCRIPT® statement;
convert, by the conversion layer, the plurality of elements in the virtual tree structure into a plurality of first views recognizable for the native layer, and send the plurality of first views to the native layer, wherein the plurality of first views comprises a first view; and
when a view structure corresponding to view structure data of the first view is cached in a resource pool, acquire, by the native layer, the view structure from the resource pool, and add the view data of the first view into view structure to implement page display, wherein the view data comprises page content of the first view, and the view structure comprises a page layout of the first view,
wherein the processor is further configured to call the program codes to:
acquire, by the native layer, a target view structure identifier from the view structure data of the first view, and search, according to the target view structure identifier, the resource pool for a view structure with a structure identifier which is the same as the target structure identifier; and
when a plurality of view structures are found in the resource pool, randomly acquire, by the native layer, the view structure from the plurality of view structures, wherein each of the plurality of view structures has a structure identifier which is the same as the target structure identifier; and wherein the processor is further configured to call the program codes to:
draw, by the native layer, view structures corresponding to the plurality of first views other than the first view according to view structure data of the other first views, and integrate the view structure into the drawn view structures to obtain a view structure corresponding to the specified webpage;
adding, by the native layer, the view data of the first view and the view data of the other first views into the view structure corresponding to the specified webpage to obtain a native page corresponding to the specified webpage; and
displaying, by the native layer, the native page.

9. The device of claim 8, wherein the processor is further configured to: after the first view is displayed, when the first view is in a hidden state, acquire, by the native layer, the view structure corresponding to the view structure data of the first view, and store the view structure into the resource pool.

10. The device of claim 8, wherein the processor is further configured to call the program codes to:
call, by the JAVASCRIPT® execution layer, a communication interface between the JAVASCRIPT® execution layer and the conversion layer to send the first drawing message to the conversion layer.

11. The device of claim 8, wherein the processor is further configured to call the program codes to:
convert, by the conversion layer, the plurality of elements in the virtual tree structure into the plurality of first views recognizable for the native layer based on a preconstructed rule database, wherein a corresponding relationship between JAVASCRIPT® statements and views is stored in the rule database.

12. The device of claim 11, wherein the processor is further configured to: when an updated JAVASCRIPT® statement and an updated view are acquired, update, by the conversion layer, the rule database according to the updated JAVASCRIPT® statement and the updated view.

13. The device of claim 8, wherein the processor is further configured to:
when a triggering operation is detected on the specified webpage, send, by the native layer, a notification message to the JAVASCRIPT® execution layer, the notification message comprising a changed element identifier;
modify, by the JAVASCRIPT® execution layer, the virtual tree structure according to the changed element identifier, and send a second drawing message to the conversion layer, the second drawing message comprising the modified virtual tree structure; and
convert, by the conversion layer, a plurality of elements in the modified virtual tree structure into a plurality of second views recognizable for the native layer, and send the plurality of second views to the native layer which performs page display.

14. The device of claim 13, wherein the processor is further configured to call the program codes to:
call, by the native layer, a communication interface between the native layer and the JAVASCRIPT® execution layer to send the notification message to the JAVASCRIPT® execution layer.

15. A non-transitory computer-readable storage medium, in which at least one instruction is stored, the at least one instruction being loaded and executed by a processor to implement a page display method; the at least one instruction comprising a JAVASCRIPT® execution layer, a conversion layer, and a native layer; the method comprising:

parsing, by the JAVASCRIPT® execution layer, a specified webpage requested to be displayed to obtain a JAVASCRIPT® file;

during execution of the JAVASCRIPT® file, generating, by the JAVASCRIPT® execution layer, a virtual tree structure, and sending a first drawing message to the conversion layer, wherein the first drawing message comprises the virtual tree structure, the virtual tree structure comprises a plurality of elements and each of the elements is described by a JAVASCRIPT® statement;

converting, by the conversion layer, the plurality of elements in the virtual tree structure into a plurality of first views recognizable for the native layer, and sending the plurality of first views to the native layer, wherein the plurality of first views comprises a first view; and when a view structure corresponding to view structure data of the first view is cached in a resource pool, acquiring, by the native layer, the view structure from the resource pool, and adding the view data of the first view into view structure to implement page display, wherein the view data comprises page content of the first view, and the view structure comprises a page layout of the first view, wherein acquiring, by the native layer, the view structure from the resource pool comprises:

acquiring, by the native layer, a target view structure identifier from the view structure data of the first view, and searching, according to the target view structure identifier, the resource pool for a view structure with a structure identifier which is the same as the target structure identifier; and when a plurality of view structures are found in the resource pool, randomly acquiring, by the native layer, the view structure from the plurality of view structures, wherein each of the plurality of view structures has a structure identifier which is the same as the target structure identifier; and wherein adding the view data of the first view into the view structure to implement page display comprises:

drawing, by the native layer, view structures corresponding to the plurality of first views other than the first view according to view structure data of the other first views, and integrating the view structure into the drawn view structures to obtain a view structure corresponding to the specified webpage;

adding, by the native layer, the view data of the first view and the view data of the other first views into the view structure corresponding to the specified webpage to obtain a native page corresponding to the specified webpage; and displaying, by the native layer, the native page.

16. The non-transitory computer-readable storage medium of claim 15, wherein each of the first views comprises view data and view structure data, the view data is configured to determine the page content corresponding to the first view and the view structure data is configured to determine the page layout corresponding to the first view.

* * * * *